(12) United States Patent
Dempski et al.

(10) Patent No.: US 7,599,520 B2
(45) Date of Patent: Oct. 6, 2009

(54) DETECTION OF MULTIPLE TARGETS ON A PLANE OF INTEREST

(75) Inventors: Kelly L. Dempski, Evanston, IL (US); Brandon L. Harvey, Chicago, IL (US)

(73) Assignee: Accenture Global Services GmbH (CH)

(*) Notice: Subject to any disclaimer, the term of this patent is extended or adjusted under 35 U.S.C. 154(b) by 671 days.

(21) Appl. No.: 11/282,349

(22) Filed: Nov. 18, 2005

(65) Prior Publication Data

US 2007/0116333 A1 May 24, 2007

(51) Int. Cl.
*G06K 9/00* (2006.01)
*H04N 5/225* (2006.01)

(52) U.S. Cl. ............ 382/103; 348/168; 345/176; 715/863

(58) Field of Classification Search .......... 382/103; 348/168; 345/173–184; 715/863
See application file for complete search history.

(56) References Cited

U.S. PATENT DOCUMENTS

| | | | |
|---|---|---|---|
| 4,595,990 A | 6/1986 | Garwin et al. | |
| 4,746,770 A | * 5/1988 | McAvinney | 250/221 |
| 4,988,981 A | 1/1991 | Zimmerman et al. | |
| 5,298,890 A | 3/1994 | Kanamaru et al. | |
| 5,319,747 A | 6/1994 | Gerrissen et al. | |
| 5,341,155 A | 8/1994 | Elrod et al. | |
| 5,395,252 A | 3/1995 | Slye et al. | |
| 5,491,743 A | 2/1996 | Shiio et al. | |
| 5,594,469 A | 1/1997 | Freeman et al. | |
| 5,598,183 A | 1/1997 | Robertson et al. | |
| 5,617,312 A | 4/1997 | Iura et al. | |
| 5,686,940 A | 11/1997 | Kuga | |
| 5,757,358 A | 5/1998 | Osga | |

(Continued)

FOREIGN PATENT DOCUMENTS

EP 1043671 A 10/2000

(Continued)

OTHER PUBLICATIONS

Paul Dietz and Darren Leigh, DiamondTouch: A Multi-User Touch Technology, *Mitsubishi Electric Research Laboratories*, 2003, 10 pages.

(Continued)

*Primary Examiner*—Aaron W Carter
(74) *Attorney, Agent, or Firm*—Brinks Hofer Gilson & Lione

(57) ABSTRACT

A system and method for determining positions of multiple targets on a planar surface is described. The targets subject to detection may include a touch from a body part (such as a finger), a pen, or other objects. The system and method may use light sensors, such as cameras, to generate information for the multiple simultaneous targets (such as finger, pens, etc.) that are proximate to or on the planar surface. The information from the cameras may be used to generate possible targets. The possible targets include both "real" targets (a target associated with an actual touch) and "ghost" targets (a target not associated with an actual touch). Using analysis, such as a history of previous targets, the list of potential targets may then be narrowed to the multiple targets by analyzing state information for targets from a previous cycle (such as the targets determined during a previous frame).

24 Claims, 13 Drawing Sheets

U.S. PATENT DOCUMENTS

| | | |
|---|---|---|
| 5,790,114 A | 8/1998 | Geaghan et al. |
| 5,793,361 A | 8/1998 | Kahn et al. |
| 5,803,810 A | 9/1998 | Norton et al. |
| 5,808,604 A | 9/1998 | Robin |
| 5,816,820 A | 10/1998 | Heinz et al. |
| 5,850,211 A | 12/1998 | Tognazzini |
| 5,870,079 A | 2/1999 | Hennessy |
| 5,886,683 A | 3/1999 | Tognazzini et al. |
| 5,991,735 A | 11/1999 | Gerace |
| 6,002,808 A | 12/1999 | Freeman |
| 6,034,652 A | 3/2000 | Freiberger et al. |
| 6,072,494 A | 6/2000 | Nguyen |
| 6,118,433 A | 9/2000 | Jenkin et al. |
| 6,147,678 A | 11/2000 | Kumar et al. |
| 6,204,852 B1 | 3/2001 | Kumar et al. |
| 6,215,498 B1 | 4/2001 | Filo et al. |
| 6,283,860 B1 | 9/2001 | Lyons et al. |
| 6,377,228 B1 | 4/2002 | Jenkin et al. |
| 6,388,680 B1 | 5/2002 | Bayrakeri |
| 6,421,042 B1 | 7/2002 | Omura et al. |
| 6,545,669 B1 | 4/2003 | Kinawi et al. |
| 6,674,447 B1 | 1/2004 | Chiang et al. |
| 6,680,714 B2 | 1/2004 | Wilmore |
| 6,774,868 B1 | 8/2004 | Bowen |
| 6,803,906 B1 * | 10/2004 | Morrison et al. ............ 345/173 |
| 6,864,901 B2 | 3/2005 | Chang et al. |
| 6,888,536 B2 | 5/2005 | Westerman et al. |
| 6,931,596 B2 | 8/2005 | Gutta et al. |
| 6,964,022 B2 | 11/2005 | Snowdon et al. |
| 2001/0019325 A1 | 9/2001 | Takekawa |
| 2001/0022575 A1 | 9/2001 | Woflgang |
| 2001/0022579 A1 | 9/2001 | Hirabayashi |
| 2002/0026441 A1 | 2/2002 | Kutay et al. |
| 2002/0039111 A1 | 4/2002 | Gips et al. |
| 2002/0075334 A1 | 6/2002 | Yfantis |
| 2002/0103625 A1 | 8/2002 | Card et al. |
| 2002/0118880 A1 | 8/2002 | Liu et al. |
| 2002/0181773 A1 | 12/2002 | Higaki et al. |
| 2003/0009578 A1 | 1/2003 | Apostolopoulos et al. |
| 2003/0063073 A1 | 4/2003 | Geaghan et al. |
| 2003/0095154 A1 | 5/2003 | Colmenarez |
| 2003/0210258 A1 | 11/2003 | Williams |
| 2003/0214524 A1 | 11/2003 | Oka |
| 2003/0225832 A1 | 12/2003 | Ludwig |
| 2004/0001048 A1 | 1/2004 | Kraus et al. |
| 2004/0012573 A1 | 1/2004 | Morrison et al. |
| 2004/0041830 A1 | 3/2004 | Chiang et al. |
| 2004/0102247 A1 | 5/2004 | Smoot et al. |
| 2004/0119662 A1 | 6/2004 | Dempski |
| 2004/0178993 A1 | 9/2004 | Morrison et al. |
| 2004/0189720 A1 | 9/2004 | Wilson et al. |
| 2004/0240708 A1 | 12/2004 | Hu et al. |
| 2004/0261026 A1 | 12/2004 | Corson |
| 2005/0017959 A1 | 1/2005 | Kraus et al. |
| 2005/0021518 A1 | 1/2005 | Snowdon et al. |
| 2005/0030255 A1 | 2/2005 | Chiu et al. |
| 2005/0052427 A1 | 3/2005 | Wu et al. |
| 2005/0052432 A1 | 3/2005 | Kraus et al. |
| 2005/0068253 A1 | 3/2005 | Bartels |
| 2005/0077452 A1 | 4/2005 | Morrison et al. |
| 2005/0210419 A1 | 9/2005 | Kela et al. |
| 2005/0212716 A1 | 9/2005 | Feigel et al. |
| 2006/0010400 A1 | 1/2006 | Dehlin et al. |
| 2006/0031786 A1 | 2/2006 | Hillis et al. |

FOREIGN PATENT DOCUMENTS

| | | |
|---|---|---|
| EP | 1 591 879 A2 | 11/2005 |
| FR | 2849511 A | 7/2004 |

OTHER PUBLICATIONS

Morrison, Gerald D., Smart Technologies, "A Camera-Based Input Device for Large Interactive Displays", IEEE Computer Graphics and Applications, vol. 25, No. 4, pp. 52-57, Jul./Aug. 2005 (2 pages) from http://csdl2.computer.org/persagen/DLAbsToc.jsp?resourcePath=/dl/mags/cg/&toc=comp/mags/cg/2005/04/g4toc.xml&DOI=10.1109MCG.2005.72.

NESTA (The National Endowment for Science, Technology and the Arts), "Music to the ears of DJs," *scenta*, published Jun. 2, 2005, 2 pages, from http://www.scenta.co.uk/music/features.cfm?cit_id=2620&FAArea1=customWidgets.content_view_1.

Scott, Mark, Public Relations Manager, "Mitsubishi Electric Research Laboratories Named Finalist for the 2003 World Technology Awards," News Release, Mitsubishi Electric Electronics USA, Inc., Cypress, Calif., Jun. 27, 2003, 1 page, from http://www.mitsubishielectric.com/news/2003/6-27-03_MERL_WTA_finalist.html.

Matshushita, Nobuyuki, et al., "HoloWall: Designing a Finger, Hand, Body and Object Sensitive Wall," *Proceedings of 10th Annual ACM symposium on User interface software and technology*, Banff, Alberta, Canada, 1997, pp. 209-210.

Ringel, Meredith, et al., "Barehands: Implement-Free Interaction with a Wall-Mounted Display," *CHI'01 extended abstracts on Human factors in computing systems*, Seattle, Washington, 2001, 6 pages.

Wilson, Andrew D., "TouchLight: An Imaging Touch Screen and Display for Gesture-Based Interaction," ICMI'04, Oct. 13-15, 2004, State College, Pennsylvania, 8 pages.

Wilson, Andrew D., "A Demonstration of TouchLight, an Imaging Touch Screen and Display for Gesture-Based Interaction," UIST'04, Oct. 24-27, 2004, Santa Fe, New Mexico, 2 pages.

Han, Jeff, "Multi-Touch Interaction Research", 2006, from http://mrl.nyu.edu/~jhan/ftirtouch/ 2 pages.

* cited by examiner

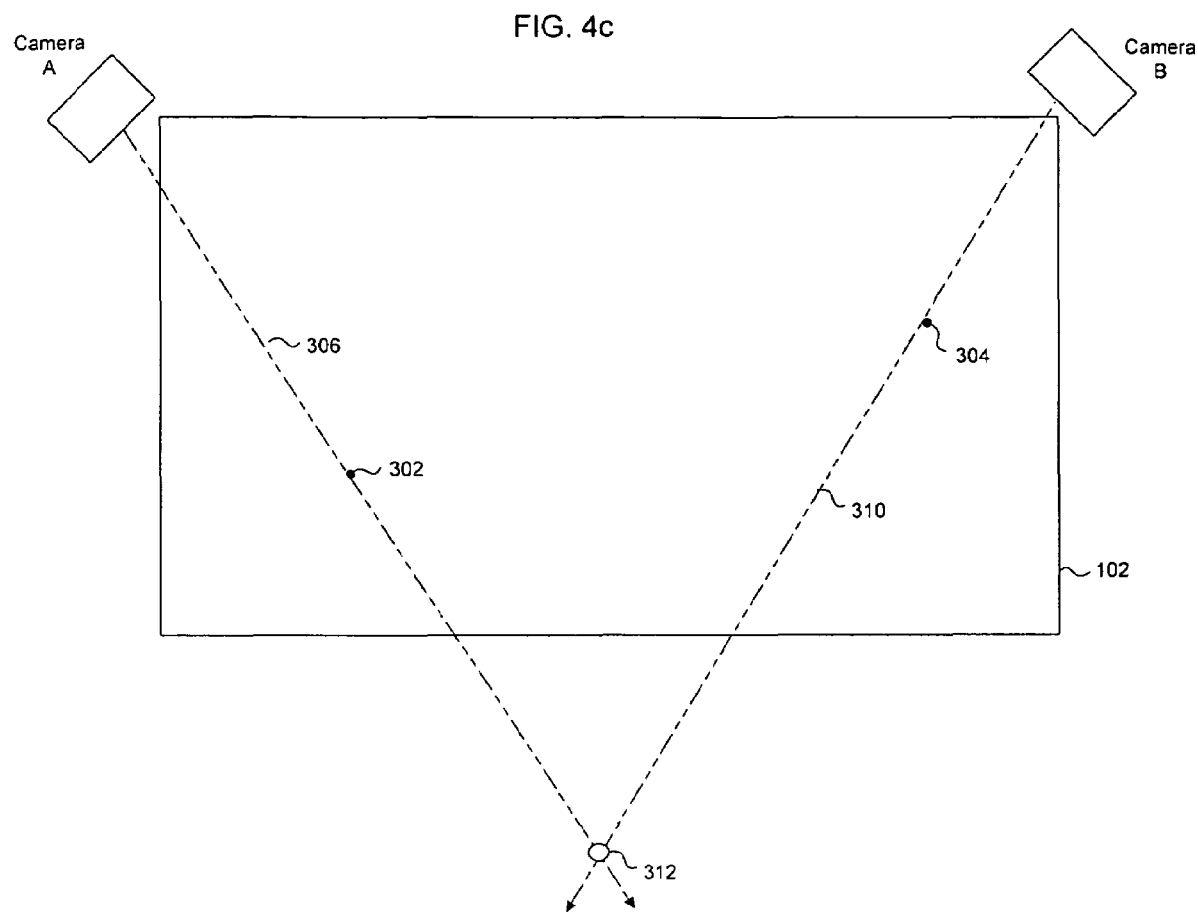

DETECTION OF MULTIPLE TARGETS ON A PLANE OF INTEREST

BACKGROUND OF THE INVENTION

1. Technical Field

The invention relates to systems for detecting and tracking targets, such as touches or movements by a user or user tool, on or near a surface. In particular, the invention relates to systems capable of detecting and tracking multiple targets simultaneously on a user interface surface using triangulation.

2. Related Art

In many situations, where computers are being accessed, used, or seen by more than one person, it may be useful to allow multiple users to input data to the system at the same time. The situations may be in a business setting or in a consumer-oriented setting.

Users may input data into a computer system in a variety of ways. Conventional examples include a keyboard, a mouse, a joystick, etc. Another conventional type of user input is a touchable display. Specifically, a user may touch a part of a display screen, and the location of the user's touch on the screen may then be sent to an application program for processing of the user's input.

Touchable displays allow one or more users to interact directly with the screen, either in conjunction with or instead of a mouse, pointer, or the like. There are many applications for touchable displays including, for example, Automated Teller Machines (ATMs), airport kiosks, manufacturing input, etc. These displays include a sensing system that passes state information as to the user's touch or interaction to application software that interprets the state information in the context of the application.

Touchable displays may use various types of sensors to detect a touch. One type of touchable display may sense changes in capacitance due to the presence of a touch on the screen. The screen may be segmented into a plurality of contact areas so that when a user touches a specific contact area, circuitry associated with the contact area may sense a change in capacitance to determine the touch. The touchable display may multiplex, or step through, sensing whether each of the plurality of contact areas has been touched. In this manner, the capacitive touchable display may sense both single and multiple touches.

Another type of touchable display may use a camera, or other type of light sensor (e.g., visual and/or infrared light sensors), to detect a touch on the screen. Camera-based touchable displays are typically used with larger-sized displays. An exemplary camera-based system is disclosed in U.S. Patent Application No. 2005/0077452A1 (U.S. application Ser. No. 10/312,983), published on Apr. 14, 2005, which is incorporated by reference. In these systems, two or more cameras may look along the length of and parallel to the surface of the screen. The cameras are thus positioned to sense a target (such as a touch from a finger, an elbow, a pen, or any other object) proximate to or touching the surface. In order for the cameras to better sense the target, a contrasting material, such as black tape or other dark material, may be placed opposite the cameras. Thus, when a user touches the screen, the cameras sense the single target as a single bright spot within each camera's field of view.

Each camera produces a two-dimensional output (i.e., a picture with no depth information) so that the target may be at any position along a ray from the focal point of the camera, through the target, and beyond. Because multiple cameras sense the target, it is possible to triangulate the position of the single target on the surface by: (1) determining the ray for each camera; and (2) determining the intersection of the two or more rays. This triangulation, thus, provides the position of the single target on the surface.

Unlike capacitive touchable systems, the camera-based systems that use triangulation are limited to detecting a single target on the screen. In the event that a second part of the screen is touched simultaneously or concurrently, the camera based system would have undefined or undesirable effects. This is due to the inability of the cameras to sense depth information and the limits of using triangulation to discern the position of touches.

Thus, there is a need for a camera-based system to detect and track multiple simultaneous targets using triangulation.

SUMMARY

In one embodiment, a target detection system generates position information for multiple simultaneous targets on a substantially planar surface using triangulation. The detected targets may include an area on the surface touched or nearly touched by a user's finger, or a user tool such as a pen, or other object. In order to determine the position information, the system and method first determines the potential positions of the targets using triangulation. The potential positions include positions for both "real" targets (i.e., a target associated with an actual touch on or near the screen) and "ghost" targets (i.e., a target that is not associated with an actual touch on or near the screen). The potential positions are then analyzed to determine which are positions for "real" targets and which are positions for "ghost" targets.

To determine the potential positions, the information sensed from at least two light sensors is used. When using cameras as light sensors, the cameras register occlusions in their field of view, the occlusions corresponding to a target, such as a bright spot representative of a finger, in the camera's field of view. For example, if there are two separate touches on the screen, each camera registers two occlusions in its field of view. To generate the potential positions, each pair of occlusions is analyzed to determine all of the potential positions. Specifically, for each pair of occlusions (one occlusion from each camera), triangulation is used to determine the potential position of the target. In the example of two occlusions in each camera's field of view, there are four combinations of occlusions and therefore four potential positions for targets, two positions corresponding to "real" targets and two positions corresponding to "ghost" targets.

The positions are then analyzed to determine the "real" targets (i.e., the "ghost" targets are removed from the list) through analysis. The analysis may include comparing the position of a potential target with a previous determined target, such as a target from a previous camera frame. For example, the position of the potential target may be compared with one or both of the position of the previous target or the expected position of the previous target (e.g., using velocity and direction, the previous target's current position may be estimated). If the position of the potential target is close to either the position of the previous target or to the expected position of the previous target, the potential target is considered to be related to the previous target. Another type of analysis may include determining whether the potential position is within the bounds of the planar surface. For example, if a potential position is outside the boundary of the planar surface, the potential position is considered a position for a "ghost" target. Still another type of analysis may include determining whether the potential position is inside or outside a portion of the surface where there is an expectation of a touch. For example, if a user is requested for input at certain sections of the surface and the potential position is outside of the sections of the surface, the potential position may be considered a position for a "ghost" target. The potential positions may thus be narrowed to a subset that represents the positions of real targets on the planar surface in the current frame.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4c is a schematic showing the two targets depicted in FIG. 4a and rays determined for a second set of occlusions.

FIG. 5a is a schematic of sensory information produced from camera A, including multiple occlusions, for the two targets depicted in FIG. 4a.

FIG. 5b is a schematic of sensory information produced from camera B, including multiple occlusions, for the two targets depicted in FIG. 4a.

DETAILED DESCRIPTION OF THE PREFERRED EMBODIMENTS

By way of overview, the preferred embodiments described below relate to a method and system for detecting locations of multiple targets on a display using cameras (or other light sensors). In many situations, where computers are being accessed, used, or seen by more than one person, it may be useful to allow multiple people to interface with the system at the same time.

There are a variety of business applications for the multi-target detector system. For instance, in a command center where a large interactive map (or other data) is displaying real-time information (see, for example, U.S. application Ser. No. 10/981,994 to Dempski et al., filed Nov. 5, 2004, which is incorporated by reference herein in its entirety), multiple users may want to work with the map at the same time, selecting objects on its surface. Prior camera-based target systems, limited to detecting single targets (such as a single touch, pen, or the like), required each user to take turns touching the screen in order to properly detect the user's single touch. With additional touch inputs, prior systems may have undefined or undesirable effects. By contrast, the present system is not so limited. A single user, or multiple users, may touch the screen multiple times, and the location of the touches may be detected properly even with a camera-based touch system.

Similarly, there are a variety of consumer applications for the multi-target detector system. For example, in a movie theater lobby, a public kiosk might display information about currently showing movies, in a tabular format some yards wide—a sort of digital billboard. Multiple, independent users might walk up and browse this information simultaneously. The multi-target system allows the touchable computed area to be treated as an active surface available to all users, a surface not requiring users to acquire an input channel, such as a mouse or a pointing tool, in order to use it. This enables a new class of valuable multi-user applications.

Figure 1:
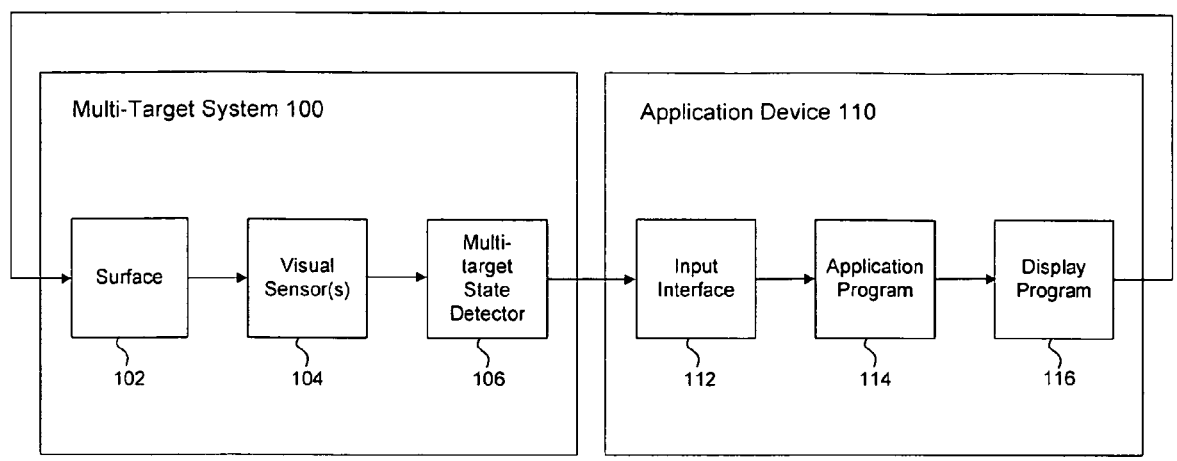
FIG. 1 is a block diagram of one configuration of the invention with a multi-target system and an application program.

Turning to the drawings, FIG. 1 shows a block diagram of one configuration of the multi-target system 100 interfacing with an application device 110. The multi-target system 100 may provide data indicative of a single location or multiple locations for targets where a user has (or users have) touched a surface 102. The surface 102 may be flat or substantially flat. The flat surface may be composed of clear plastic or glass, and may abut a single or a series of display screens (such as LCD display screens). Or, the flat surface may be coated on one side, with the display being projected onto one side of the surface.

The multi-target system may further include one or more light sensors 104. The light sensors may comprise cameras, such as CCD-based cameras or other image-acquisition devices. The CCD-based cameras may capture electromagnetic information, such as from the visible and/or infrared spectra. An example of a CCD camera is Lumenera Lu275. The image captured by the CCD-based cameras may be single images in any suitable format including digital formats such as jpeg (referring to a standard data format advanced by the Joint Photographic Experts Group) or gif (Graphics Interchange Format), or other, or the video images may be a motion picture image, such as a data file encoded according to a standard such as that proposed by the Motion Picture Experts Group (MPEG or one of its variants) or other standard. Other light sensors may include infrared sensors, which may be any sensing device that responds to heat, energy or radio emissions from a device to produce an image.

One example of a configuration of the multi-target system comprises two or more cameras that look along the viewing surface, with the cameras' fields of view parallel to that surface. A section of black tape may be placed along the bottom and sides of the surface so that, without any touch present, the portion of the camera that senses the image near the surface 102 is black. In effect, the camera may "see" only a black strip when no touch is present. When a target such as a user's finger or elbow, a pen, or the like is proximate to, or touches, the surface 102, the finger, viewed against the black tape registers a change or an occlusion in the field of view of the camera, which may be subsequently processed. For example, the occlusion may comprise a bright spot within the field of view within the camera. Thus, the cameras may acquire images of the multiple simultaneous targets on the planar surface.

The information from the cameras may be sent to the multi-target state detector 106. The multi-target state detector 106 therefore is configured to receive signals from the light sensors 104 and provide any necessary signals in return. For example, for receiving a jpeg format file from a camera, the multi-target state detector receives a jpeg formatted file from the camera and stores the file, providing appropriate network handshaking signals to the camera. In another example, the format maybe streamed data from another camera. In either case, the format may comprise data indicative of the images of the multiple simultaneous targets on the surface.

As discussed more fully below, the multi-target state detector 106 may sense the state of a single target on the surface 102 or the states of multiple targets on the surface 102. As discussed above, a target may comprise a finger, a pen, or other object that is proximate to or touches the planar surface. The state of the target may comprise any characteristic of the target, such as position of the target, size of the target, or movement of the target (e.g., general movement (up, down, left, right) or speed).

The states of the targets may be sent to an application device 110 for processing. The application device 110 may include an input interface 112 that receives the determined states of the targets from the multi-target state detector 106. Further, application program 114 may use the states of the targets as inputs for control of the program. One example of an application program is disclosed in co-pending U.S. patent application Ser. No. 10/981,994, to Dempski et al. filed Nov. 5, 2004. The application program may then send its output to a display program 116. For example, the display program 116 may display onto the surface 102 an image or other rendering. The image displayed may include a single image or a series of image tiles of a tiled output display, as discussed in co-pending U.S. patent application Ser. No. 10/981,994, to Dempski et al. filed Nov. 5, 2004. Thus, the multi-target system 100 may detect position and movement of a user's hand and, in conjunction with the application device 110, indicate the position and motion of the user's hand. For example, if the hand motion should be interpreted as a left click, right click or other mouse actuation of the display on the surface 102, the application device 110 will respond appropriately by processing the hand motion and, if appropriate, reflecting the hand motion in the display portion controlled.

Figure 2:
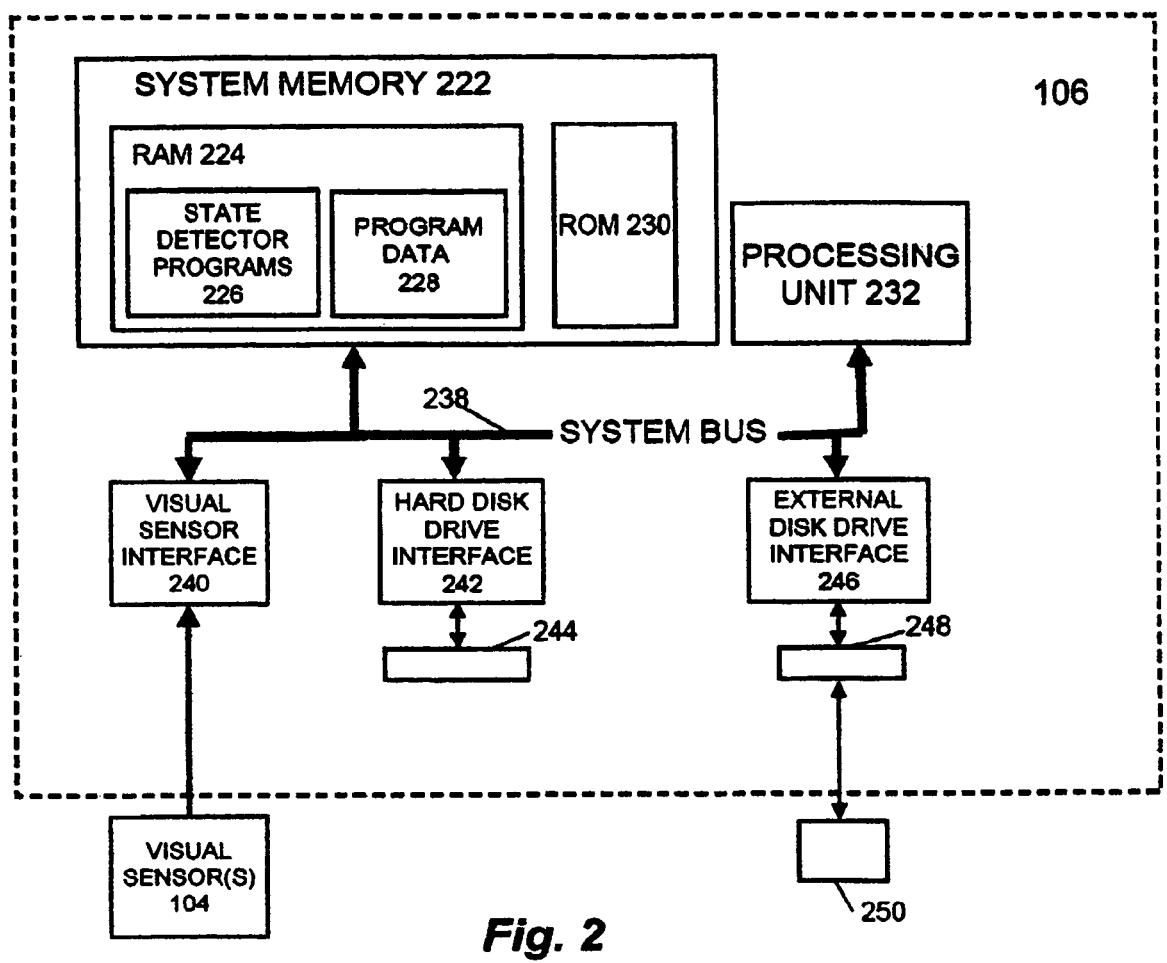
FIG. 2 is an expanded block diagram of the multi-target system shown in FIG. 1.

With reference to FIG. 2, an expanded block diagram of the multi-target state detector 106 in FIG. 1 is shown. Multi-target state detector 106 may comprise a general purpose computing device, including a processing unit 232, a system memory 222, and a system bus 238, that couples various system components including the system memory 222 to the processing unit 232. The processing unit 232 may perform arithmetic, logic and/or control operations by accessing system memory 222. The system memory 222 may store information and/or instructions for use in combination with processing unit 232. The system memory 222 may include volatile and non-volatile memory, such as random access memory (RAM) 224 and read only memory (ROM) 230. RAM 224 may include state detector programs 226, which may include computer-readable programming corresponding to the flow charts in FIGS. 3a-b, 6a-b, and 7a-b. Further, RAM 224 may include program data 228, such as data required to execute the state detector programs 226. A basic input/output system (BIOS) containing the basic routines that helps to transfer information between elements within the computer environment 220, such as during start-up, may be stored in ROM 230. The system bus 238 may be any of several types of bus structures including a memory bus or memory controller, a peripheral bus, and a local bus using any of a variety of bus architectures.

Multi-target state detector 106 may receive input from light sensor(s) 104 via a light sensor interface 240. As discussed in more detail below, the input from the light sensor interface may comprise data such as that shown in FIGS. 5a and 5b. Multi-target state detector 106 may further include a hard disk drive 244 for reading from and writing to a hard disk (not shown), and an external disk drive 248 for reading from or writing to a removable external disk 250. The removable disk may be a magnetic disk for a magnetic disk driver or an optical disk such as a CD ROM for an optical disk drive. The hard disk drive 244 and external disk drive 248 may be connected to the system bus 238 by a hard disk drive interface 242 and an external disk drive interface 46, respectively. The drives and their associated computer-readable media provide nonvolatile storage of computer readable instructions, data structures, program modules and other data for the multi-target state detector 106. Although the exemplary environment described herein employs a hard disk and an external disk 250, it should be appreciated by those skilled in the art that other types of computer readable media which can store data that is accessible by a computer, such as magnetic cassettes, flash memory cards, random access memories, read only memories, and the like, may also be used in the exemplary operating environment. Though FIG. 2 depicts RAM 224 as storing the state detector programs 226, any one of, any combination of, or all of the hard disk, external disk 250, ROM 230 or RAM 224 may store the state detector programs 226.

The system may track multiple targets at the same time. Initially, there may be no targets registered in the system. When new targets arrive, the targets may be added one at a time to a list of known, active targets, and tracked independently of other pre-existing targets. The multi-target system 100 may notify, either constantly or periodically, any connected client software, such as application device 110, of the state of all tracked targets. The application device 110 may comprise any program adapted to accept such state information, such as, for example, a command center or movie kiosk application program. Given the state information, developers of application programs are enabled to provide software behaviors that reflect these multiple input streams, such as moving two objects independently, on different parts of the screen, based on independent user inputs.

In one aspect of the invention, the multi-target system 100 first determines potential positions. The potential positions may include both positions corresponding to "real" targets (e.g., targets corresponding to an actual touch) and positions corresponding to "ghost" targets (e.g., targets not corresponding to actual targets). The potential positions are then analyzed to determine which are positions corresponding to "real" targets and which are positions corresponding to "ghost" targets.

Figure 3A:
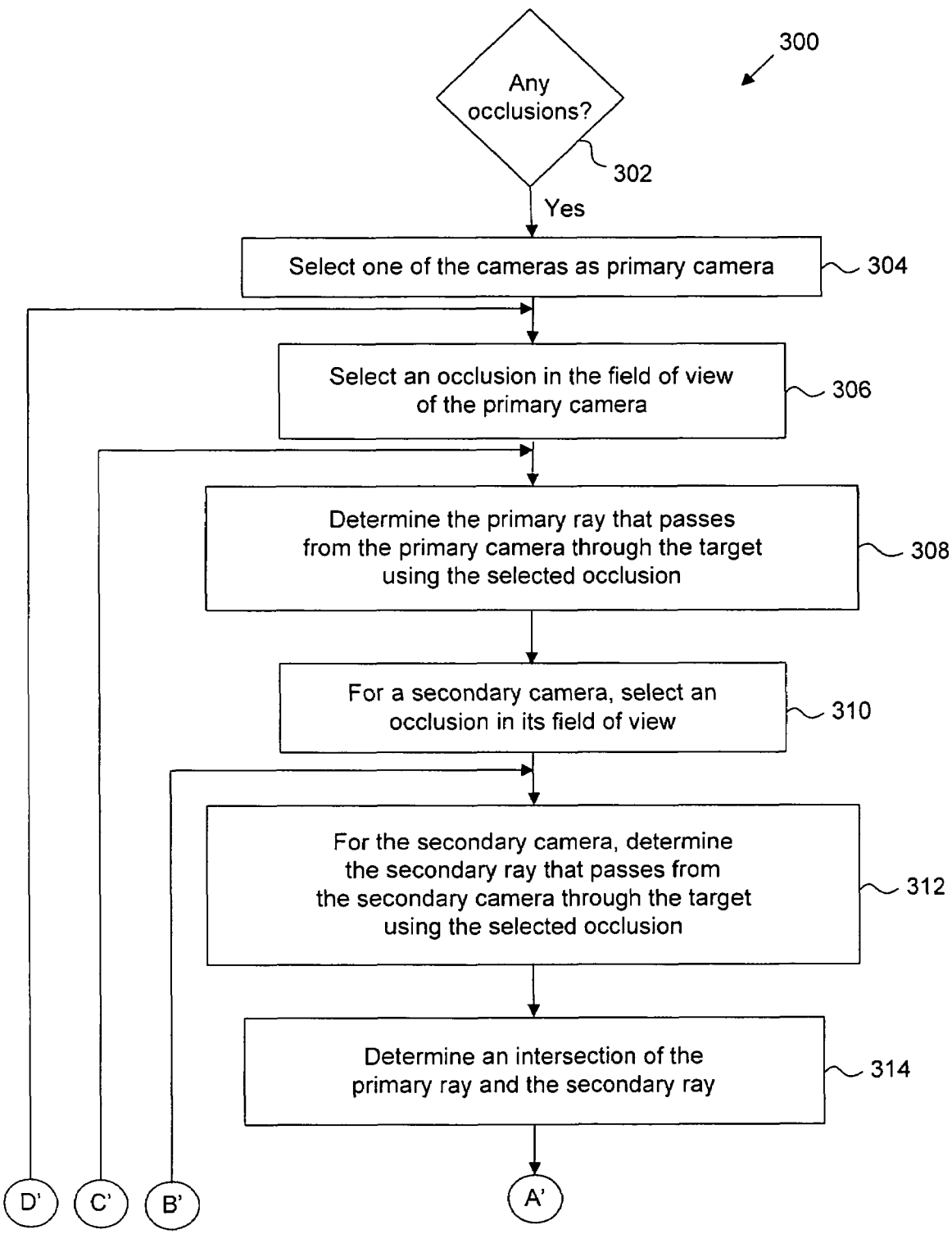
FIGS. 3a-b is one example of a flow chart for determining a list of possible targets.
Figure 3B:
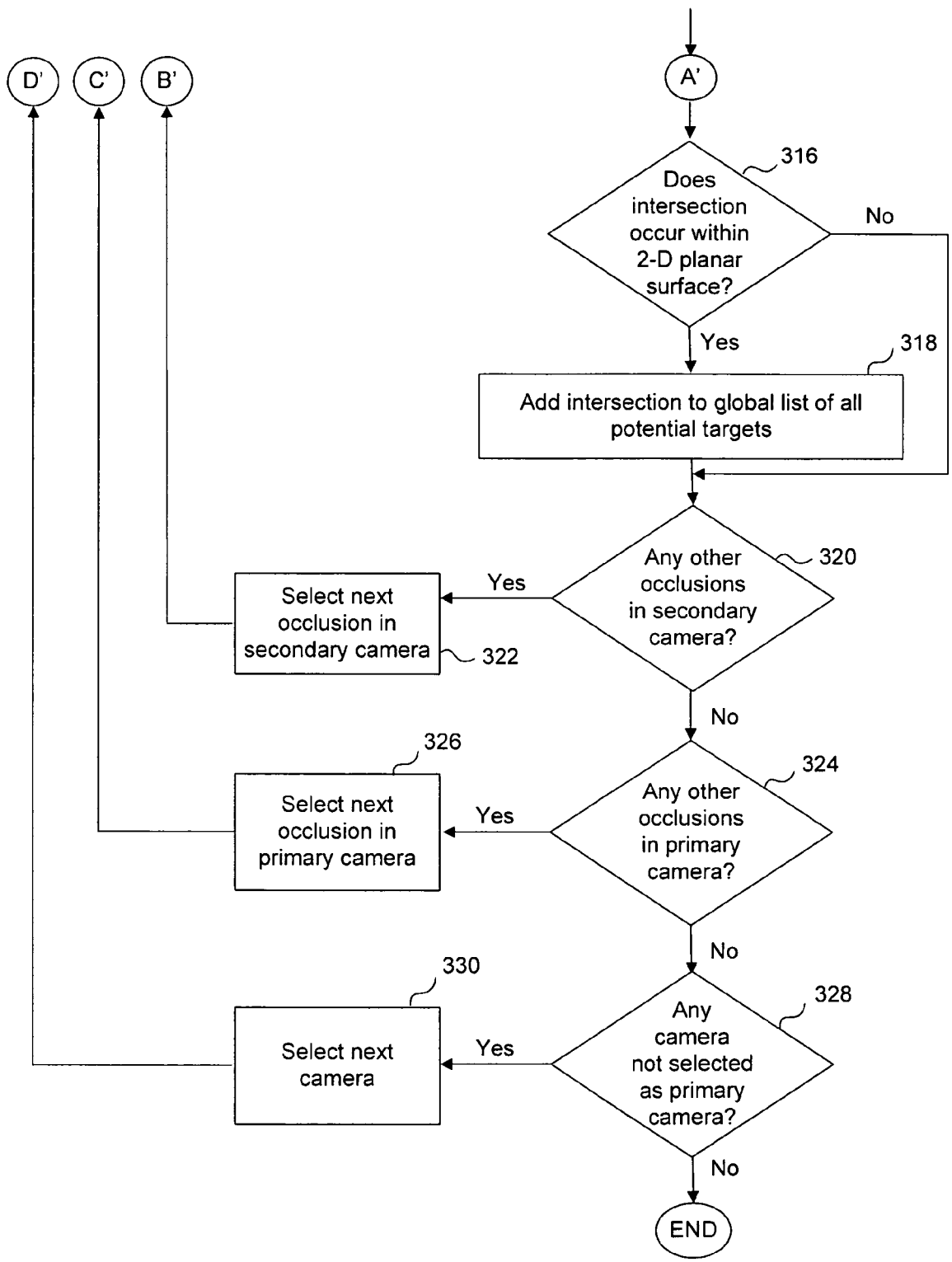

Referring to FIGS. 3a and 3b, there is shown a flow chart 300 of one example of a methodology for determining the potential positions, and one example of analyzing the potential positions to determine whether the positions correspond to "real" or "ghost" targets. As shown at block 302, the multi-target state detector 106 determines whether there are any occlusions. This determination at block 302 may be performed for every frame of information received from the cameras, or may be performed after a group of frames are received. As discussed above, an occlusion may be any variation in the field of view of the camera. For example, an occlusion may comprise a section in the field of view that is brighter than an adjacent section. The occlusion may thus register if a target is present in the image acquired by the cameras. If an occlusion is present, one of the cameras is selected as the primary camera, as shown at block 304. For example, the light sensor(s) 104 may comprise two cameras, camera A and camera B. Camera A may first be designated as the primary camera. For the primary camera selected, one of the occlusions in its field of view is selected, as shown at block 306. Using the occlusion, the ray, which may be designated the primary ray, is determined that passes from the camera through the position of the target, as shown at block 308.

Figure 4A:
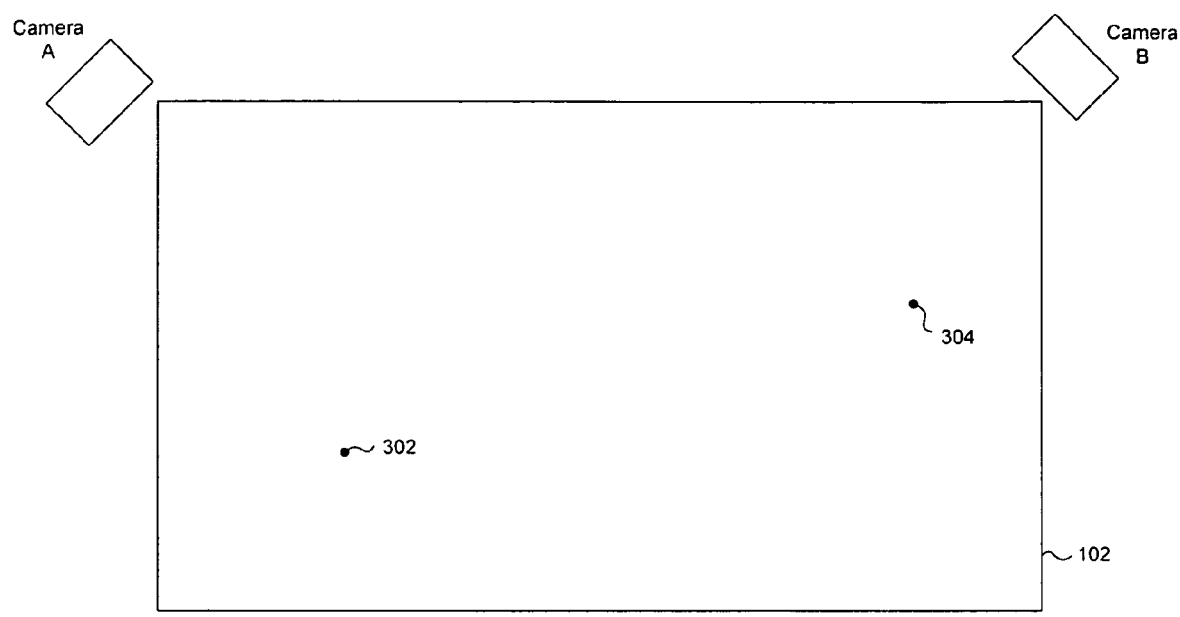
FIG. 4a is a schematic showing two targets on a planar surface.
Figure 5A:
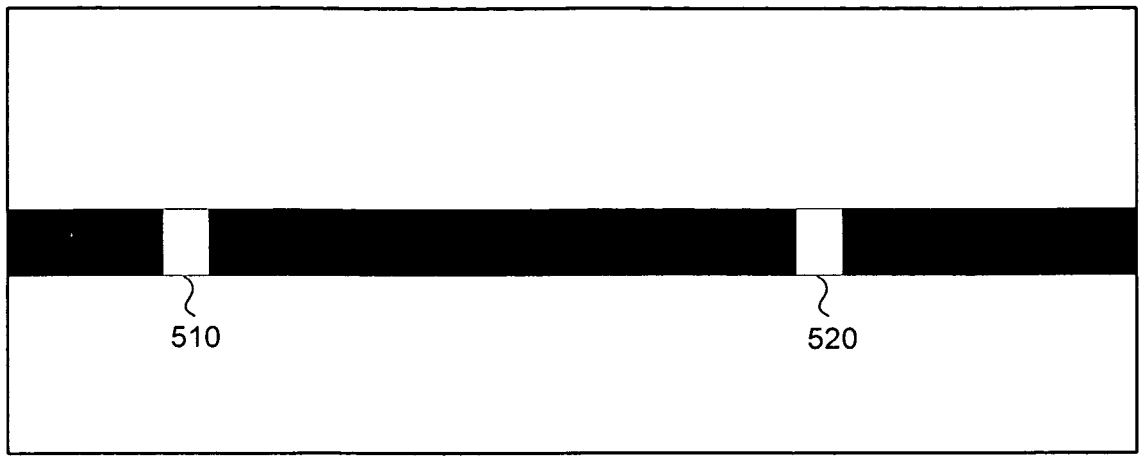
Figure 5B:
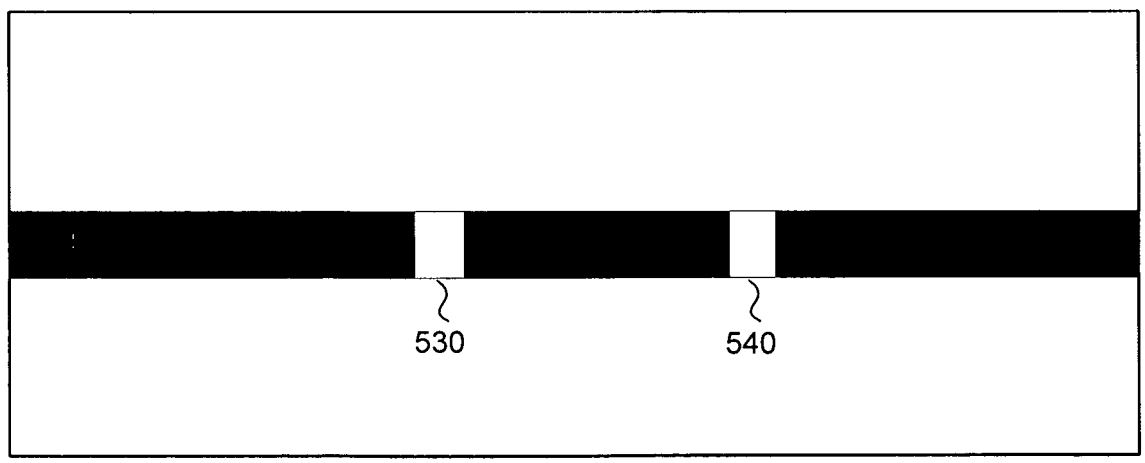

Referring to FIG. 4A, there is shown an example of Camera A and Camera B, and two targets 302, 304 on the planar surface 102. As discussed above, Camera A registers the occlusions. The occlusions may register as bright spots 510, 520 in the field of view of Camera A, as shown in FIG. 5a. The occlusions 510, 520 are indicative of two targets 302, 304. Because Camera A provides no depth information (i.e., how far the touch or target is from the camera), Camera B provides additional information used to triangulate the position, as discussed in more detail below. Similarly, Camera B may register the occlusions, such as shown in FIG. 5b. The occlusions 530, 540 are indicative of the targets 302, 304. Camera A and Camera B are positioned so that each field of view extends beyond the peripheral edge of the planar surface 102. In this way, the entire planar surface 102 is within the fields of view of Camera A and Camera B.

FIGS. 5a and 5b illustrate one frame of data provided by the cameras. In one embodiment, the cameras may be programmed to transfer data at approximately 135 frames/second. The frames may be sent sequentially so that the cameras provide sequential image information. Commercially available camera-based touchable displays typically operate at a much slower frame rate, such as on the order of 30 frames/second. The increase in the frame rate may enable better determination of targets on the surface. For example, analysis of targets in previous frames enables potentially better determination of a current frame's targets, as discussed in more detail below. Only a portion of the camera's output is required to be sent to the multi-target state detector 106 for processing, as shown in FIGS. 5a and 5b. Therefore, the camera may be programmed to transmit only a narrow band of data required for processing, as shown in FIGS. 5a and 5b. This may enable the cameras to increase the frame rate transmitted.

Using the occlusion from Camera A, a ray may be calculated that is indicative of passing through a potential target. For example, one of the occlusions, as shown in FIG. 5a, is 510. Using a look-up table, the occlusion may be correlated to ray 306, shown in FIG. 4b. For example, the output of CCD camera shown in FIG. 5a may include a set of pixels, such as 1 to 1,600, corresponding to the image captured. If pixel number 1350 in a CCD camera is above a predetermined brightness, indicating an occlusion, the look-up table may be accessed to determine the ray correlated to pixel number 1350. The ray may be represented in a variety of ways, such as using two points along the ray $(x_1, y_1; x_2, y_2)$ or a point along the ray and a slope $(x, y; m)$.

The look-up table may be generated at any time during operation, such as during an initialization process. For example, when the light sensor 104 is a CCD camera, the pixels generated by the camera may be correlated to a particular ray. As shown in FIGS. 5a and 5b, the narrow band of data transmitted may correspond to a discrete number of pixels, such as 1600 pixels. Each of the pixels, or groups of pixels, may be assigned to a ray. In order to compile the look-up table during initialization, various pre-determined points on the planar surface may be touched (such as by pasting a white object to a point on the planar surface). The corresponding pixels that light up may then be recorded, and assigned to the pre-determined points on the planar surface. Using this data, the rays corresponding to each pixel or a group of pixels may be determined. If the cameras shift relative to the screen, the system may need to be re-initialized or calibrated in the manner as noted above.

Figure 4B:
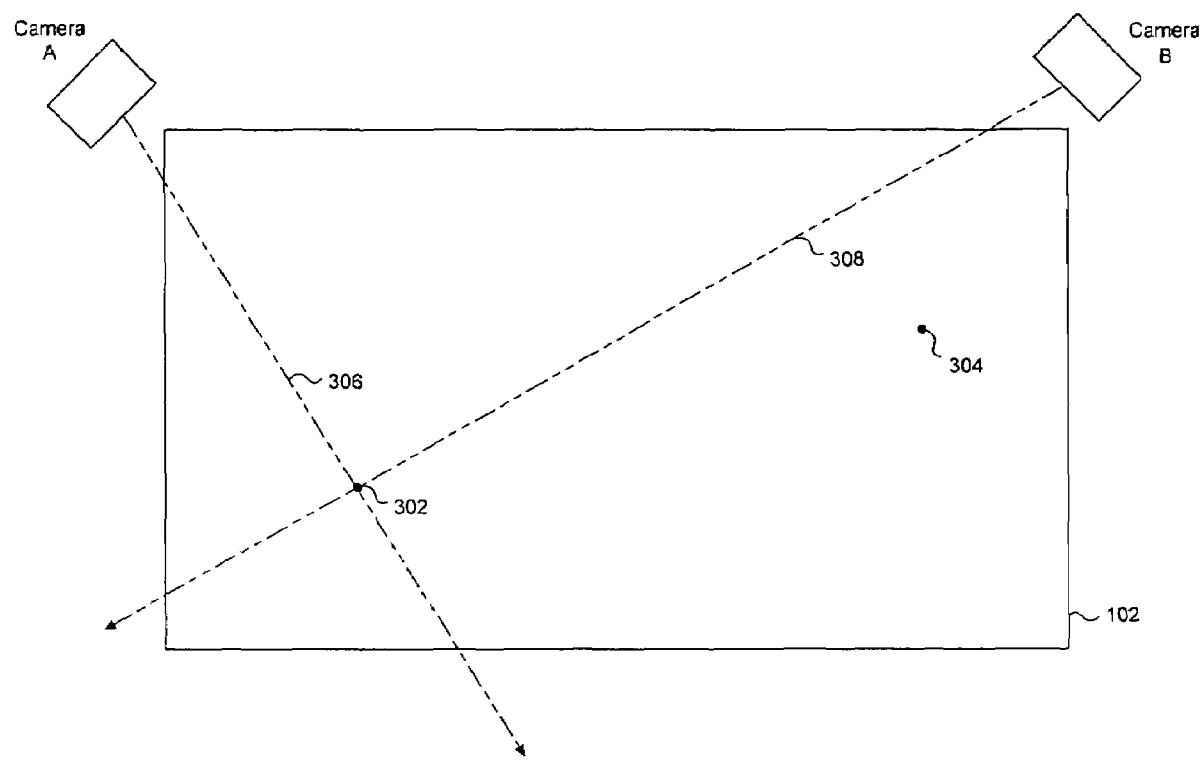
FIG. 4b is a schematic showing the two targets depicted in FIG. 4a and rays determined for a first set of occlusions.
Figure 4D:
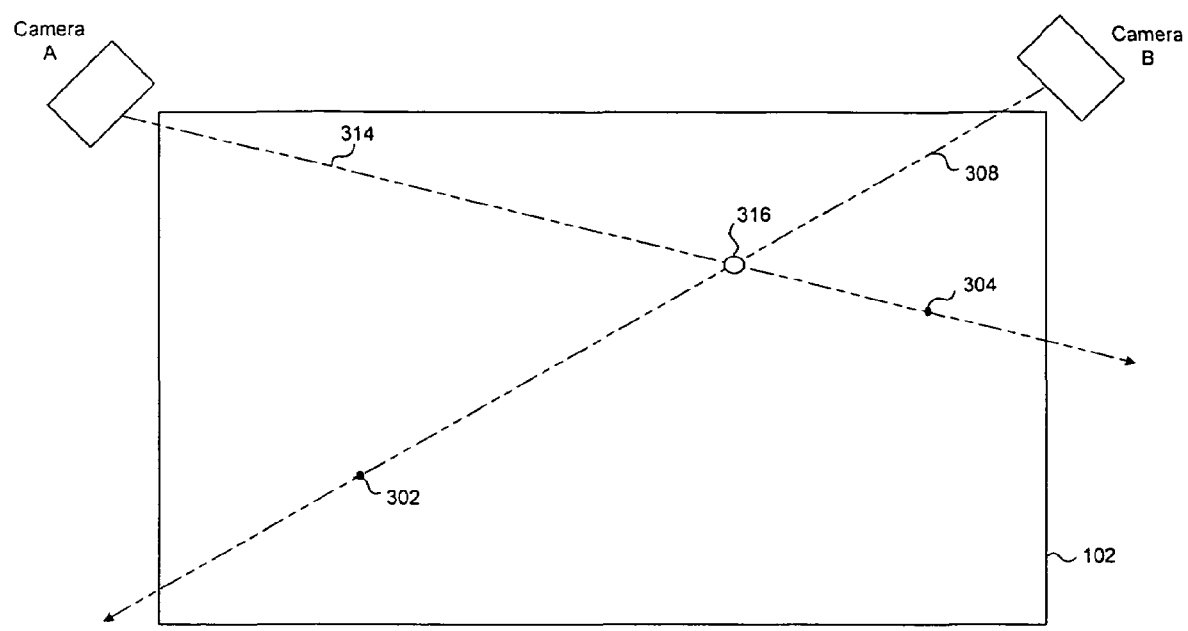
FIG. 4d is a schematic showing the two targets depicted in FIG. 4a and rays determined for a third set of occlusions.

As shown in block 310, an occlusion may be selected in the secondary camera, such as Camera B, for analysis. For example, occlusion 530 may be selected. For the secondary camera, using the occlusion from Camera B, a ray may be calculated that is indicative of passing through a potential touch, as shown in block 312. For occlusion 530, ray 308 passes through touch 302. The intersection of the two rays (primary ray and second ray) is calculated, as shown at block 314. The intersection may be calculated by mathematically determining, for the two rays, whether there is an intersection point. The intersection point (302) is considered the potential position. Subsequent analysis determines whether the potential position is a position for a "real" target or a position for a "ghost" target. In the case of FIG. 4b, the subsequent analysis will determine that the potential position is a position for a "real" target. In the case of two real targets, there are four potential positions generated, two positions corresponding to "real" targets and two positions corresponding to "ghost" targets. As shown in FIGS. 4a-b, the two "real" targets are 302 and 304. The two "ghost" targets are shown in FIGS. 4c-d as 312 and 316. The system may also determine the positions for more than two real targets, such as three, four, five, or six real targets.

There are several ways to determine whether a potential position is a position for "real" or "ghost" target. One way is to determine whether the potential position is within the boundary of the planar surface 102, as shown at block 316. If the intersection point is within the bounds, the intersection may be a position corresponding to a real target. Therefore, the intersection point is added to a global list of all possible targets, as shown at block 318. The global list of targets is subject to further analysis, as discussed below with reference to FIGS. 6a-b and FIGS. 7a-b. In FIG. 4b, the intersection point of rays 306 and 308 occurs at target 302, which is within the bounds of the planar surface. Therefore, the potential position is added to the global list of all potential targets.

The multi-target state detector 106 then determines whether there are any other bright spots in the field of view of the secondary camera, as shown at block 320. In the example shown in FIG. 5b, there is one more occlusion 540. Therefore, the next spot is selected, as shown at block 320. FIG. 4C is a schematic of the determination of the rays and the intersection point for occlusion 510 for Camera A and occlusion 540 for Camera B. As discussed above, ray 306 is the ray that corresponds to occlusion 510. Ray 310 is the ray that corresponds to occlusion 540. FIG. 4c shows the intersection point of the two rays, which may be mathematically calculated as discussed above. The intersection point, designated as 312 in FIG. 4c, is outside the bounds of the planar surface. Therefore, at block 316, the intersection point is deemed not to be a position corresponding to a "real" target and will not be added to the global list for further analysis.

The output from the primary camera is then analyzed to determine if there are any other occlusions, as shown at block 324. If so, the next occlusion is selected (as shown at block 326) and the process is repeated. For example, FIG. 4d shows the determination of the rays for a second occlusion 520 from Camera A. The second occlusion corresponds to ray 314. As discussed above, occlusion 530 corresponds to ray 308. The two rays result in an intersection point 316. Intersection point 316 is within the bounds of the planar surface 102 and is therefore added to the global list of possible targets, as shown at block 318. However, the intersection point corresponds to a "ghost" target because it does not correspond to the presence of a physical target at that intersection point. Subsequent processing, discussed in FIGS. 6a-b, further analyzes whether the potential positions correspond to a "real" target or a "ghost" target.

After all of the occlusions of Camera B are analyzed, other cameras may be analyzed. For example, if a third camera, such as Camera C, is used, the methodology may iterate through similar analysis with Camera A selected as the primary camera and Camera C selected as the secondary camera. After all of the secondary cameras are analyzed, it is determined whether any camera has not been selected as the primary camera, as shown at block 328. For example, if Camera B has not been selected as the primary camera, it is selected, as shown at block 330, and the process is repeated. In this manner, all of the potential positions may be determined.

The list of potential positions may be analyzed to determine which are positions corresponding to "real" targets and which are positions corresponding to "ghost" targets. As discussed above, the analysis may be based on a variety of factors. For example, the determination as to whether a potential position corresponds to a "real" target may be based on the history, including the position and/or speed history, of a previous target. In one aspect, the history may be compiled one target at a time, whereby only one additional target may be added to the history in a current frame of processing. In this manner, the system first sees no targets on the planar surface, then one target on the surface, and then multiple targets on the surface. Using this sequence, when more than one target is seen on the surface, the history (which includes at least one target) may be used to detect the multiple targets currently on the planar surface, as discussed in more detail below.

FIGS. 6a-b and 7a-b are flow charts for determining which of the current potential positions correspond to real targets and for determining state information for the real targets. The figures compile a list of real targets. The list may be cleared at the beginning of each analysis (such as after each frame is received). Through analysis of various aspects of the previous target (including the previous target's position and current expected position), the potential positions may be added to the list. For example, the previous target may be compared with the potential position (corresponding to a potential target in the current frame) in a variety of ways. Specifically, the distance between the position of a previous target and the potential position. As another example, the position of a previous target extrapolated to the current frame may be compared with the potential position. As still another example, rays formed between the position of the previous target and potential position may be analyzed. Further, an expected position of a touch may be compared with the potential positions to determine which potential position corresponds to a "real" target. For example, if a certain section of the surface is expected to have a touch (such as a pop-up box requesting selection of "open," "cancel," etc.), the sections of the surface may be compared with the potential positions. If the potential position is within one of the sections of the surface expected to have a touch, the potential position may be deemed to correspond to a "real" target; otherwise, the potential position may be determined to correspond to a "ghost" target. For this analysis, the multi-target state detector 106 may receive information from the application program 114 which indicates which sections of the surface are expected to have a touch.

Figure 6A:
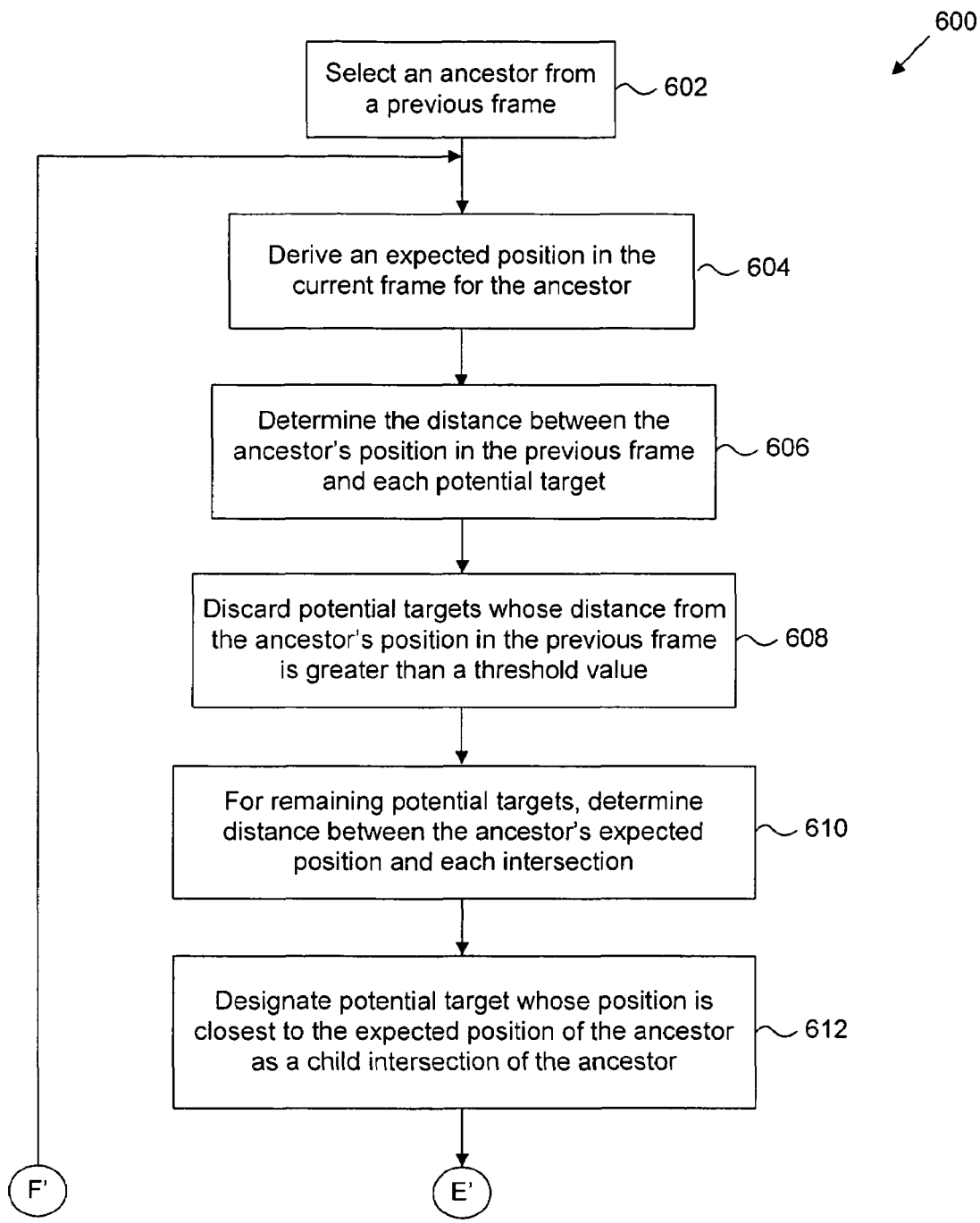
FIGS. 6a-b is one example of a flow chart for narrowing the list of possible targets.
Figure 6B:
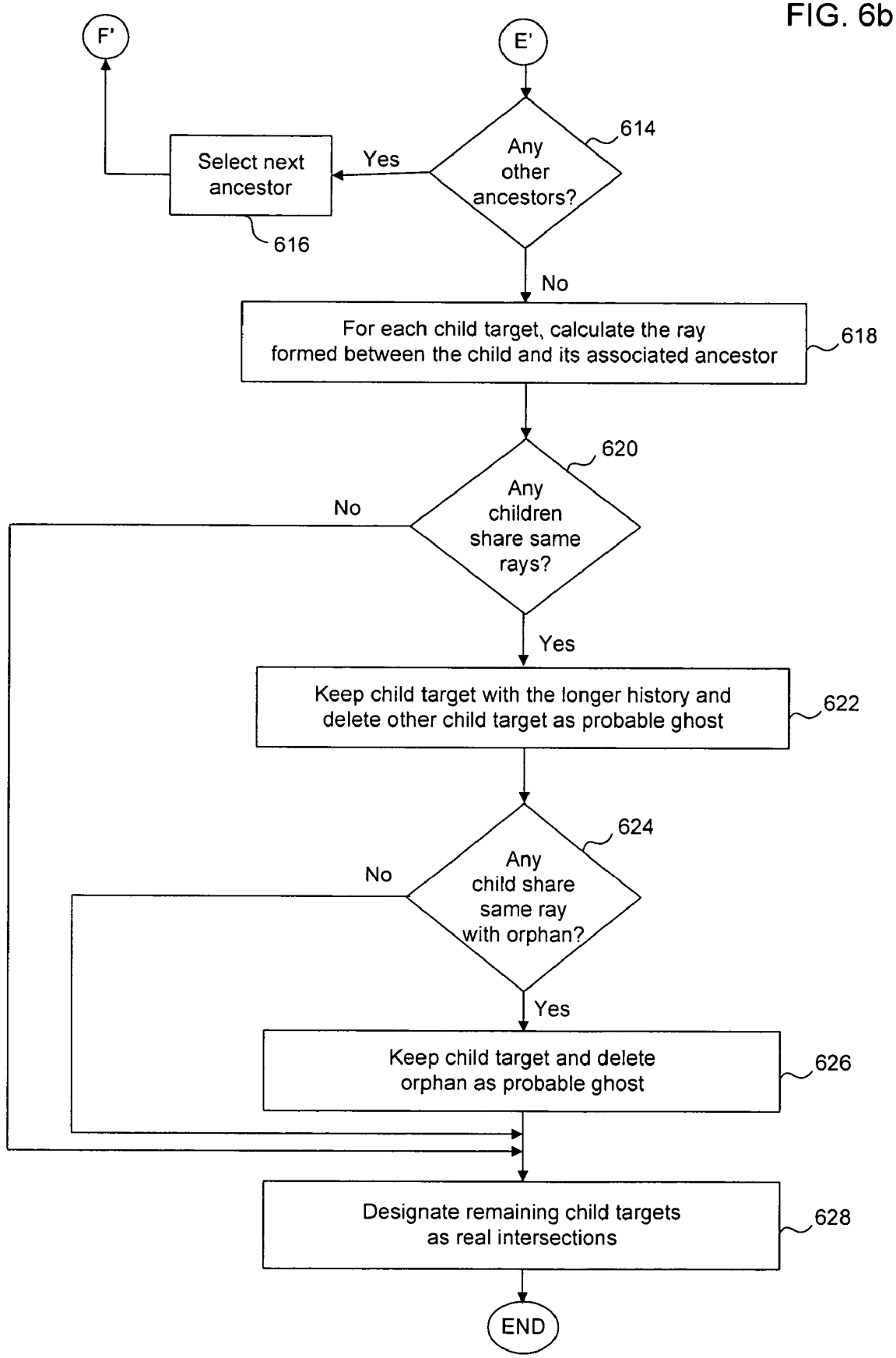

Referring to FIGS. 6a-b, there is shown one example of a flow chart 600 for analyzing the potential positions. To analyze the potential positions, the potential positions (which correspond to potential targets in the current frame) are analyzed to determine whether one or some of potential targets are "related" or correspond to previous targets. For example, the potential targets and previous targets may be deemed to be "related" by an "ancestor-child" relationship. An "ancestor target" describes intersections that corresponded to a real target in a previous processing cycle, such as the last camera frame. A "child target" describes a target in the current frame that is "related," such as a being a continuation of the previous target into the current frame. An "ancestor target" from a previous frame may be selected, as shown at block 602. A list of 0 or more "ancestor targets" may be compiled and saved from a previous processing cycle, such as the last camera frame. In the new frame currently being processed, one mode of analysis is to determine is whether any of the potential targets in this current frame match up with an "ancestor target" from the last frame. This may indicate that the intersections both refer to a single real target on the 2D plane, even though that target may move from frame to frame. If there is correspondence between targets past and present, one can define an ancestor-child relationship between the two targets.

An expected position may be derived in the current frame for the selected ancestor target, as shown at block 604. The expected position may be determined in a variety of ways, such as based on the position of the ancestor target and instantaneous velocity of the ancestor target in the previous frame. A distance may be determined between the ancestor target's position in the previous frame and each of the potential positions corresponding to the potential targets, as shown at block 606. Potential targets may be discarded whose distance from the ancestor target's position in the previous frame is greater than a predetermined threshold, as shown at block 608. The predetermined threshold may be a function of several variables, such as the framerate of the camera, the resolution of the screen, and/or assumptions of how fast the target will move. For example, if the framerate of the camera is higher, the threshold may be lower. Moreover, if the CCD camera provides pixel information, the threshold may be a function of the real physical resolution of the screen. For instance, if one assumes that a person would move their finger no more than 1 inch per frame (i.e., approximately $\frac{1}{100}$th of a second), and the screen has a resolution of 50 pixels/inch, then the threshold would be approximately 50 pixels.

For the non-discarded potential targets, determine the distance between the ancestor target's expected position (as determined in block 604) and each non-discarded possible target, as shown at block 610. The potential target whose position is closest to the expected position is designated as a child of the ancestor target, as shown at block 612. This completes and extends the ancestor-child relationship, which may extend over many camera frames. This process is repeated for any other ancestor targets (block 614), with the next ancestor target selected (block 616).

Further, rays formed between the child target and its associated ancestor target may be calculated, as shown at block 618. For example, a child target has associated with it a set of coordinates for its potential position, such as $x_C$ and $y_C$. Similarly, an ancestor target has associated with it a set of coordinates for its position in a previous frame, such as $x_A$ and $y_A$. A ray may be calculated that includes both sets of coordinates ($x_C$, $y_C$; $x_A$, $y_A$). Analysis of the rays may assist in determining whether a potential target is a "real" target. For example, if two child targets share the same rays, the target whose ancestor-child relation goes farther into the past—the child with the longer history—trumps and the other child is deleted as a probable ghost. As another example, if a child target shares any rays with an orphan, which may be a new intersection point that has not been successfully matched with any ancestors, the child target trumps and the orphan may be deleted as a ghost.

As shown at block 620, it is determined whether any child targets share the same rays. If so, the child target with the longer history is kept on the list and the other child target is deleted as a ghost, as shown at block 622. Moreover, as shown at block 624, it is determined whether any child target shares the same ray with an orphan. If so, the child target is kept on the list and the orphan is deleted as a probable ghost, as shown at block 626. The remaining child targets are thus designated as "real" intersections, as shown at block 628.

Figure 7A:
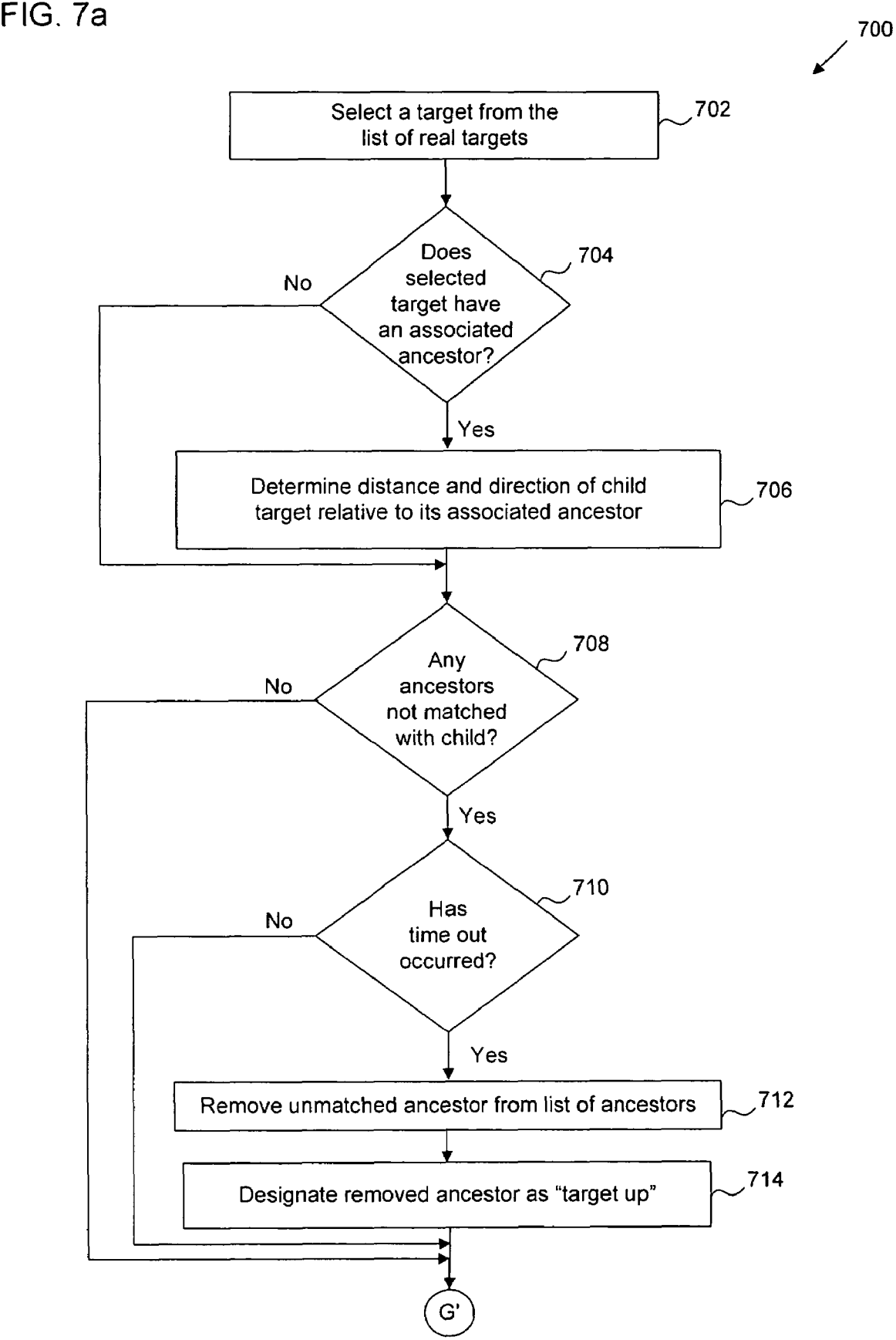
FIGS. 7a-b is another example of a flow chart for narrowing the list of possible targets and for determining movement of a target.
Figure 7B:
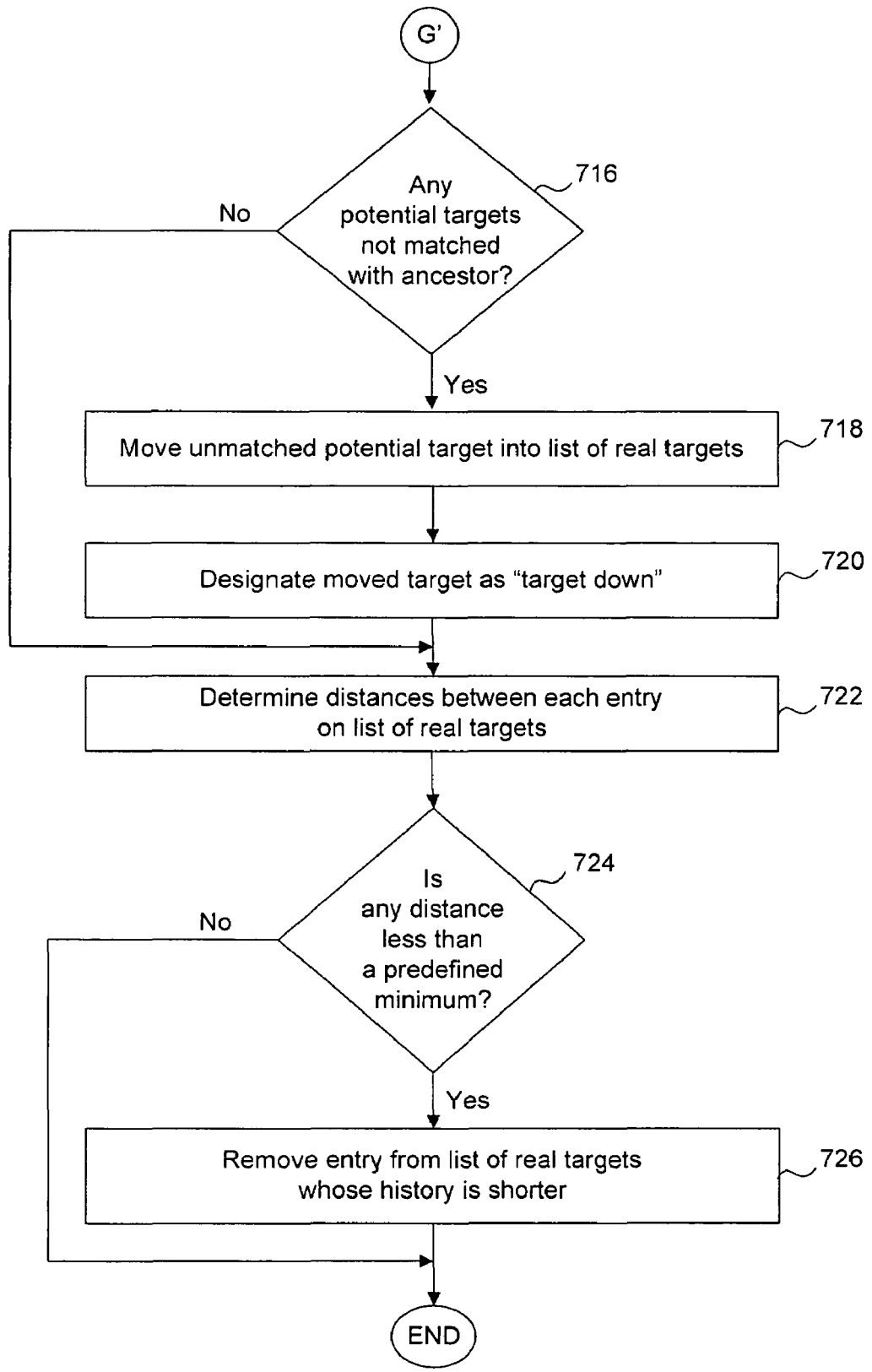

Referring to FIGS. 7*a-b*, there is shown one example of a flow chart 700 for analyzing potential targets, including potential orphan targets and movement of the targets. A target is selected from the list of real targets, as shown at block 702. It is determined whether the selected target has an associated ancestor, as shown at block 704. If yes, the distance and direction of the child target is determined relative to its associated ancestor, as shown at block 706. This distance and direction information, as well as other movement information, may be stored for use in future analysis. For example the distance and direction information may be used to determine the expected position of the target in the next frame.

In order to determine whether a target has been removed, such as a user lifting his finger from the screen, it is determined whether any ancestors are not matched with a child, as shown at block 708. Further, it is determined whether a timeout has occurred, as shown at block 710. If yes, the ancestor target is removed from the list (block 712) and the removed ancestor is designated as "target up" (block 714). Depending on the sampling rate, the timeout may comprise a predetermined expiration period, such as a specific number of milliseconds or specific number of frames. The timeout may be selected such that the target is given a chance to reappear after a very brief pause, such as due to vibration or sensor error. The timeout period may be measured in a predetermined number of frames that the target is no longer registered. For example, the timeout period may include 3 frames (or approximately 3/100 of a second if the frames run at 100 frames per second) that the target is no longer registered. As another example, the timeout period may include 1 frame.

As shown at block 716, it is determined whether any possible targets on the list of possible targets have not been matched to an ancestor. This indicates that a new target (i.e., an orphan who does not have an ancestor) has been acquired. For example, the user may have just put his finger on the planar surface. The unmatched possible target is moved into the list of real targets (block 718) and designated as "target down" (block 720).

As shown at block 722, distances are determined between each entry on the list of real targets. If any distance is less than a predetermined minimum (block 724), the entry from the list of real targets whose history is shorter is removed (block 726). The predetermined distance acts as a measure of the same target moving from frame to frame (such as the same finger moving from one frame to the next). The predetermined minimum may be selected based on the current frame rate of the CCD camera. For example, if the frame rate is low (e.g., 20 frames per second), the amount of time a person may move his/her finger in one frame is greater than a higher frame rate. Therefore, the predetermined minimum (which acts as part of the pruning process) is larger for cameras that are slower. For a camera that operates at 100 frames per second, the predetermined minimum is 100 pixels (selected for an approximately 10 foot surface of 4096 pixels).

This sequence removes potentially inadvertent targets close to a more-established target. For example, a user may touch a part of the screen with his finger and inadvertently touch the screen with the cuff of his shirt. To remove or prune these inadvertent targets, a minimum distance between eligible targets is established so that some entries from the list may be pruned. The targets with the longer history, such as those maintaining longer ancestor-child relationships, are preferred to younger ancestor-child relationships. This may implement the heuristic that the firmest and longest-lasting targets on the planar surface are the one most important to users.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The flow charts in FIGS. 3*a-b*, 6*a-b*, and 7*a-b* may be encoded in a signal bearing medium, a computer readable medium such as a memory, programmed within a device such as on one or more integrated circuits, or processed by a controller or a computer. If the methods are performed by software, the software may reside in a memory resident to or interfaced to the multi-target system 100, a communication interface, or any other type of non-volatile or volatile memory. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A camera-based system for detecting positions of multiple simultaneous targets on a substantially planar surface comprising:
   at least two cameras positioned relative to the planar surface to acquire images of the multiple simultaneous targets on the planar surface; and
   computer-readable memory having stored thereon logic for receiving data indicative of images of the multiple simultaneous targets, determining potential positions using triangulation, the potential positions comprising positions for the multiple simultaneous targets and positions for targets not associated with a touch on the planar surface, and analyzing the potential positions to determine which, of the potential positions, comprise the positions for the multiple simultaneous targets.

2. The system of claim 1, wherein a target is registered as an occlusion in the image acquired by the cameras; and
   wherein the logic for determining the potential positions using triangulation comprises logic for selecting one of the at least two cameras and iterating the following logic for each occlusion for the selected camera:
   determining a ray corresponding to the occlusion for the selected camera; and
   determining rays corresponding to the occlusions for an unselected camera; and
   triangulating the ray corresponding to the occlusion for the selected camera and the rays corresponding to the occlusions for the unselected camera to determine the potential positions.

3. The system of claim 1, wherein the logic for analyzing the potential positions to determine the positions for the multiple simultaneous targets comprises logic for determining whether the potential positions are related to a target previously identified.

4. The system of claim 3, wherein the cameras provide information in sequential image frames; and
   wherein the target previously identified comprises a target identified in a previous frame.

5. The system of claim 4, wherein the target identified in a previous frame includes a position of the target in the previous frame; and
   wherein the logic for determining whether the potential positions are related to a target previously identified comprises logic for comparing the potential positions with the position of the target in the previous frame.

6. The system of claim 5, wherein the logic for comparing the potential positions with the position of the target in the previous frame comprises:
   logic for determining the potential position closest to the position of the target in the previous frame; and
   logic for designating the potential position closest to the position of the target in the previous frame as related to the target in the previous frame.

7. The system of claim 4, wherein the multiple simultaneous targets are sensed in a current frame; and
   wherein the logic for determining whether the potential positions are related to a target previously identified comprises logic for comparing the potential positions with an expected position of the target in a current frame.

8. The system of claim 7, wherein the logic for comparing the potential positions with an expected position of the target in a current frame comprises:
   logic for determining the potential position closest to the expected position of the target in the previous frame; and
   logic for designating the potential position closest to the expected position of the target in the previous frame as related to the target in the previous frame.

9. The system of claim 3, wherein the logic for analyzing the potential positions to determine the positions for the multiple simultaneous targets comprises logic for:
   determining rays formed between the potential positions and their related target previously identified; and
   comparing the rays to determine if any rays are identical.

10. The system of claim 9, wherein the logic for analyzing the potential positions to determine the positions for the multiple simultaneous targets further comprises logic for:
    determining for the potential positions whose rays are identical which potential position has a longer history with the target previously identified; and
    identifying the potential position with the longer history with the target previously identified as one of the multiple simultaneous targets.

11. The system of claim 1, wherein the logic for analyzing the potential positions to determine the positions for the multiple simultaneous targets comprises logic for determining whether the potential positions are within a 2-dimensional boundary of the planar surface.

12. The system of claim 1, further comprising logic for determining a distance between the positions for the multiple simultaneous targets.

13. The system of claim 12, further comprising logic for:
    comparing the distance with a predetermined minimum distance; and
    determining which of the multiple simultaneous targets has a shorter history if the distance is less than the predetermined minimum; and
    deleting the multiple simultaneous target with the shorter history.

14. A computer implemented method for detecting positions of multiple simultaneous targets on a substantially planar surface using at least two cameras positioned relative to the planar surface, the method comprising:
    acquiring an image by the at least two cameras of the multiple simultaneous targets on the planar surface;
    based on the image, determining, using a computer processor, potential positions using triangulation, the potential positions comprising positions for the multiple simultaneous targets and positions for targets not associated with a touch on the planar surface; and
    analyzing, using the computer processor, the potential positions to determine which, of the potential positions, comprise the positions for the multiple simultaneous targets.

15. The method of claim 14, wherein a target is registered as an occlusion in an image acquired by the camera; and
    wherein determining, using the computer processor, the potential positions using triangulation comprises selecting one of the at least two cameras and iterating for each occlusion for the selected camera, determining a ray corresponding to the occlusion for the selected camera, determining rays corresponding to the occlusions for an unselected camera, and triangulating the ray corresponding to the occlusion for the selected camera and the rays corresponding to the occlusions for the unselected camera to determine the potential positions.

16. The method of claim 14, wherein analyzing, using the computer processor, the potential positions to determine the positions for the multiple simultaneous targets comprises determining whether the potential positions are related to a target previously identified.

17. The method of claim 16, wherein the cameras provide information in sequential frames; and wherein the target previously identified comprises a target identified in a previous frame.

18. The method of claim 17, wherein the target identified in a previous frame includes a position of the target in the previous frame; and wherein determining, using the computer processor, whether the potential positions are related to a target previously identified comprises comparing the potential positions with the position of the target in the previous frame.

19. The method of claim 17, wherein the multiple simultaneous targets are sensed in a current frame; and wherein determining, using the computer processor, whether the potential positions are related to a target previously identified comprises comparing the potential positions with an expected position of the target in a current frame.

20. The method of claim 16, wherein analyzing the potential positions, using the computer processor, to determine the positions for the multiple simultaneous targets comprises:

determining rays formed between the potential positions and their related target previously identified; and comparing the rays to determine if any rays are identical.

21. The method of claim 20, wherein analyzing, using the computer processor, the potential positions to determine the positions for the multiple simultaneous targets further comprises:

determining for the potential positions whose rays are identical which potential position has a longer history with the target previously identified; and identifying the potential position with the longer history with the target previously identified as one of the multiple simultaneous targets.

22. The method of claim 14, wherein analyzing, using the computer processor, the potential positions to determine the positions for the multiple simultaneous targets comprises determining whether the potential positions are within a 2-dimensional boundary of the planar surface.

23. The method of claim 14, further comprising determining, using the computer processor, a distance between the positions for the multiple simultaneous targets.

24. The method of claim 23, further comprising:

comparing, using the computer processor, the distance with a predetermined minimum distance; and determining, using the computer processor, which of the multiple simultaneous targets has a shorter history if the distance is less than the predetermined minimum; and deleting the multiple simultaneous target with the shorter history.

* * * * *

UNITED STATES PATENT AND TRADEMARK OFFICE
CERTIFICATE OF CORRECTION

PATENT NO. : 7,599,520 B2 Page 1 of 1
APPLICATION NO. : 11/282349
DATED : October 6, 2009
INVENTOR(S) : Dempski et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 671 days.

Delete the phrase "by 671 days" and insert -- by 992 days --

Signed and Sealed this

Fourth Day of May, 2010

David J. Kappos
*Director of the United States Patent and Trademark Office*